Patented Nov. 21, 1933

1,935,769

UNITED STATES PATENT OFFICE 1,935,769

GLUE OR GELATINE COATING COMPOSITION

Charles le Bos d'Espinoy, Neuilly sur Seine, France, assignor to Malcolm C. Rorty, of Lusby, Maryland No Drawing. Application October 22, 1931, Serial No. 570,501, and in France November 3, 1930

3 Claims. (Cl. 134—23)

The present invention relates in general to compositions for use in the production of surface coatings and more particularly to such compositions containing animal glue or gelatine, as for example adhesives, sizing compositions, waterpaints, etc.

Animal glues or gelatines in their natural state dissolve under heat in water, but on cooling they coagulate to take the form of a jelly. However, it is possible to use them cold in coating compositions, such as in sizing compositions employed for covering ceilings and walls, but in only small amounts, for example, 3 to 5 parts for 97 to 95 parts of carbonate of lime. Unfortunately, owing to this small percentage of glue which cannot be exceeded without complete coagulation of the mass, such coating compositions have very small adhesiveness and are not resistant to any kind of surface rubbing.

It has been proposed to maintain the cold liquid state of glues by adding acids to them, for example, acetic acid, but the market price of such cold glues is high and does not permit their use on large surfaces.

It is conceivable that all that would be necessary for the proper use of a glue or gelatine coating composition would be to maintain it hot during its use, but this procedure is not practicable and does not result in the desired end, since the glue would not fail to coagulate as soon as in contact with the colder surfaces on which the coating composition is applied, thereby preventing the adherence and the spread of the coating composition, for it must not be forgotten that the adhesive property of glues in the coagulated state is practically nil.

The present invention has for an object to provide surface coating compositions of the character described, which contain a high percentage of animal glue and which, in spite of their high glue content, possess great adhesiveness and covering power.

In accordance with the invention, the animal glue or gelatine in water solution is caused to be maintained in a liquid or uncoagulated condition at ordinary temperatures by the addition of infusorial or diatomaceous earths, in the natural state of calcined. These extremely porous and light materials either in the natural state or calcined, prevent coagulation, so that the coating compositions prepared hot may cool without coagulation detrimental to its adhesive power and to its use. The novel coating compositions resulting from the addition of such materials may be readily applied on surfaces, in spite of their low temperature, with ordinary coating implements, such as paint brushes, trowels, sprayers, etc., as long as the water they contain has not evaporated to such an extent as to cause them to pass into the solid state. In fact it is easier to employ them at room temperature than it is to employ them hot. The anti-coagulating property of infusorial or diatomaceous earths, calcined or not, is not explainable scientifically, but is a fact easily proved by experience.

The invention may be applied not only to the production of animal glues or gelatines per se, but to the production of materials with a base of animal glue or gelatine, utilized in admixture with filling materials or pigments to eventually form coating compositions, such as, for example, sizing compositions for ceilings and waterpaints.

According to the nature of the glue or gelatine and eventually of the filling materials employed, the following products are obtained:

(1) Adhesive materials to unite objects together;

(2) Coating compositions for use as substitutes for "gelatinous white" for ceiling sizing, also as foundations to receive paint, etc.

The anti-coagulating property of infusorial or diatomaceous earths in the nature state or calcined permits the incorporation of greater proportions of glue or gelatine which is nevertheless maintained in a liquid or pasty condition at ordinary temperatures, and consequently makes possible the production of coating compositions of greater adherence and of greater solidity once they are dried.

When employing calcined infusorial or diatomaceous earths, as, for example, kieselguhr, finer and harder surfaces are obtained than when employing these materials in the natural state. The calcination of the natural earths may be effected either by external heat or by combustion on relatively large exposed areas of a mixture of infusorial or diatomaceous earths with a combustible, which mixture has been brought, for example, to a comminuted state or even to the condition of a powder. For this purpose it is possible to utilize the natural stratums in which are found infusorial or diatomaceous earths and lignites in a state of admixture.

The proportion of the anti-coagulating materials which may be added to the glue and to the inert materials depends essentially upon the purpose in view. The proper quantity to suit each individual case is determined by experience alone. Thus this proportion can vary, depending upon the surrounding temperature, from a minimum of approximately 15% for strong glues and 85% for skin glues up to 100% and even more. The stronger the glue by reason of its very nature, the more the proportion of anti-coagulant to be added increases. The lower the surrounding temperature, the greater becomes the amount of anti-coagulant to be added.

The following examples set forth specific applications of the invention, although they are not to be construed as a limitation of its scope.

*Example 1.—Cold glue*

| | Kgs. |
|---|---|
| Strong dry animal glue | 30 |
| Diatomaceous earths calcined or not | 70 |

Water is added in sufficient quantity to cause the final product to have at the surrounding temperature a degree of liquidity necessary for the use it is intended.

The glue is added and dissolved in the water in the usual manner, and the diatomaceous earths are intimately mixed therewith. The mixture is allowed to cool and may then be used as an adhesive.

*Example 2.—Cold glue*

| | Kgs. |
|---|---|
| Dry animal glue | 70 |
| Natural infusorial earths | 30 |

The glue and the natural infusorial earths are mixed with water, the mixture being prepared in the same manner as in Example 1 and being likewise used as an adhesive.

*Example 3.—Cold sizing*

| | Kgs. | |
|---|---|---|
| Commercial dry skin glue | 15 or | 7 |
| Anti-coagulant as above described | 15 or | 23 |
| Carbonate of lime or similar substance | 70 or | 70 |

The glue is dissolved in hot water and to the later is added the anti-coagulant and the carbonate of lime. The mixture is allowed to cool and may then be applied on surfaces with a brush or trowel. Sizing prepared in this manner, whether polished or not, permits any kind of paint to be applied thereto.

*Example 4.—Cold water-paint*

| | Kgs. |
|---|---|
| Commercial dry skin glue | 30 |
| Anti-coagulant as above described | 20 |
| Coloring substance, ochre, etc. | 50 |

These materials are mixed with water in the same manner as in Example 3, and the composition may be applied with a brush, trowel or sprayer.

Having thus described certain embodiments of my invention, what I claim is:

1. A liquid coating composition characterized in that it contains, in addition to the liquid vehicle, a large proportion of animal glue or gelatine and sufficient infusorial or diatomaceous earth to maintain said glue or gelatine in an uncoagulated condition at ordinary temperatures.

2. A sizing composition characterized in that it contains, in addition to water and carbonate of lime, a large proportion of animal glue or gelatine and sufficient infusorial or diatomaceous earth to retard coagulation of said glue or gelatine during application at ordinary temperatures.

3. A liquid water-paint characterized in that it contains, in addition to water and the coloring material, a large proportion of animal glue or gelatine and sufficient infusorial or diatomaceous earth to maintain said glue or gelatine in an uncoagulated condition.

CHARLES LE BOS D'ESPINOY. [L. S.]